(12) United States Patent
Meille et al.

(10) Patent No.: US 8,394,192 B2
(45) Date of Patent: Mar. 12, 2013

(54) FORMULATION, UTILISATION AND PROCESS TO OBTAIN A LIGHTWEIGHT STRUCTURAL CONCRETE

(75) Inventors: Sylvain Meille, Tignieu-Jameyzieu (FR); Gilles Chanvillard, Saint Georges D'Esperanche (FR); Arnaud Schwartzentruber, Genas (FR); Emmanuel Bonnet, Chabons (FR)

(73) Assignee: Lafarge, Paris (FR)

( * ) Notice: Subject to any disclaimer, the term of this patent is extended or adjusted under 35 U.S.C. 154(b) by 170 days.

(21) Appl. No.: 12/682,418

(22) PCT Filed: Oct. 10, 2008

(86) PCT No.: PCT/IB2008/003988
§ 371 (c)(1),
(2), (4) Date: Apr. 27, 2010

(87) PCT Pub. No.: WO2009/083809
PCT Pub. Date: Jul. 9, 2009

(65) Prior Publication Data
US 2010/0212551 A1    Aug. 26, 2010

(30) Foreign Application Priority Data

Oct. 12, 2007 (FR) ..................... 07 07164
Jun. 30, 2008 (FR) ..................... 08 03655

(51) Int. Cl.
*C04B 28/04* (2006.01)
(52) U.S. Cl. ........ 106/705; 106/713; 106/716; 106/724; 106/737; 106/789
(58) Field of Classification Search .................. 106/713, 106/705, 716, 724, 737, 789
See application file for complete search history.

(56) References Cited

U.S. PATENT DOCUMENTS

| | | | |
|---|---|---|---|
| 3,814,614 A | 6/1974 | Kraemer | |
| 4,077,809 A | 3/1978 | Plunguian et al. | |
| 4,077,890 A | 3/1978 | Barker | |
| 2002/0117086 A1 | 8/2002 | Shi et al. | |
| 2007/0125275 A1 | 6/2007 | Bui | |

FOREIGN PATENT DOCUMENTS

| | | |
|---|---|---|
| BE | 843768 | 11/1976 |
| FR | 2625131 | 6/1989 |
| GB | 1165005 | 9/1969 |
| JP | 6122569 | 5/1994 |

OTHER PUBLICATIONS

Copeland et al.; "Quantitative X-Ray Diffraction Analysis"; Portland Cement Association, Research and Development Laboratories, Chicago Ill.; Analytical Chemistry; vol. 30, No. 2, Feb. 1958; pp. 196-201.

*Primary Examiner* — Paul Marcantoni
(74) *Attorney, Agent, or Firm* — Pillsbury Winthrop Shaw Pittman, LLP

(57) ABSTRACT

A lightweight structural concrete includes a hydraulic binder; effective water; a superplasticizer; and aggregates; the concrete having a density in the fresh state varying from 1.40 to a $D_{max}$ value calculated according to formula (I) $D_{max}=1.58+(a \times AM)$ in which "a" represents a coefficient for which the value is equal to 1; "AM" represents the mass percentage of the amorphous materials contained in 1 m³ of fresh concrete; the concrete having a maximum fresh state density $D_{max}$ less than or equal to 1.85; the concrete having a $W_{effective}/L$ ratio varying from 0.19 to 0.46, where $W_{effective}$ represents the quantity of effective water in kilogram per cubic meter of fresh concrete; "L" represents the quantity of cement and additions in kilograms per cubic meter of fresh concrete; the concrete including a quantity of effective water varying from 100 to 230 liters per cubic meter of fresh concrete; the concrete including a quantity of Portland clinker greater than or equal to 150 kilograms per cubic meter of fresh concrete; the concrete including a quantity of (Portland clinker+optionally fly ash+optionally slags+optionally silica fume+optionally calcined shale+optionally calcined clays) greater than or equal to 300 kilograms per cubic meter of fresh concrete; the concrete having a volume of paste greater than or equal to 300 l/m³ of fresh concrete; the concrete including from 1 to 16% by volume of air.

19 Claims, No Drawings

FORMULATION, UTILISATION AND PROCESS TO OBTAIN A LIGHTWEIGHT STRUCTURAL CONCRETE

CROSS-REFERENCE TO RELATED APPLICATIONS

This is the U.S. National Stage of PCT/IB2008/003988, filed Oct. 10, 2008, which in turn claims priority to French Patent Application Nos. 0707164, filed Oct. 12, 2007, and 0803655, filed Jun. 30, 2008, the entire contents of all applications are incorporated herein by reference in their entireties.

The scope of the present invention relates to lightweight structural concretes with low thermal conductivity. Such concretes can be used to make structures cast on site, pre-cast structures or elements of pre-cast structures for buildings and civil engineering structures.

Structural concrete comprises aggregates (that is to say sands, gravel, fine gravel, pebbles) which are bound together by a hydraulic binder. A hydraulic binder comprises cement and optionally additions. When the hydraulic binder is put in contact with water, it hydrates and sets. Admixtures are optionally added to improve the characteristics of the hydraulic binder. The relative proportions of the four main constituents of an ordinary concrete are the following:

|  | Water | Air | Cement | Aggregates |
|---|---|---|---|---|
| Volume | 14%-22% | 1%-6% | 7%-14% | 60%-78% |
| Mass | 5%-9% | N/A | 9%-18% | 63%-85% |

The mechanical compressive strengths typically obtained on 16×32 mm cylindrical specimens for an ordinary structural concrete are generally of the order of 25 to 35 MPa, (a C25/30 type of concrete according to the EN 206-1 Standard).

Among the well known aggregates in the field of construction materials, lightweight aggregates are generally artificial and made from mineral materials, which are used in particular for the production of concretes known as « lightweight » concretes. The lightweight aggregates are in particular defined by the NF EN 13055-1 Standard of December 2002. These lightweight aggregates are for example clays (expanded clays), shale (expanded shale) or silicates (vermiculite or perlite).

Among the well known aggregates in the field of construction materials, aggregates are also found, treated to reduce their water absorption capacity by different types of materials and using different processes. Furthermore, aggregates are found, which are partially or totally pre-saturated in water by immersion carried out at least 24 hours before use of the said saturated aggregates.

The aggregates are characterised not only by the materials which constitute them but also by their porosity, that is to say, the volume of void per unit of apparent volume (or Volume of void/total Volume). The porosity is a function of the real volume density $\Delta$ and of the volume density of the solid constituting the aggregate, $\gamma_0$, according to formula p %=100 (1−$\Delta$/$\gamma_0$).

The water content of the structural concretes used in the industry is generally in a range of 5 to 9% by mass. The concrete comprises different categories of water. Primarily, the effective water is the water located between the grains of the solid skeleton formed by the aggregates, the cement and the additions. The effective water therefore represents the water involved in the hydration. On the other hand, the concrete comprises water retained by the porosity of the aggregates. This water is not taken into account in the effective water. It is assumed to be trapped and not involved in the hydration of the cement. The total water represents the totality of the water present in the mix (at the time of mixing).

Thermal conductivity (also called lambda ($\lambda$)) is a physical value characterising the behaviour of the materials during the transfer of heat by conduction. Thermal conductivity represents the quantity of heat transferred per surface unit and per time unit for a temperature gradient. In the international system of units, thermal conductivity is given in watts per meter per Kelvin, ($W \cdot m^{-1} \cdot K^{-1}$). Conventional concretes have thermal conductivity from 1.3 to 2.1 at 23° C. and 50% relative humidity. Conventional lightweight structural concretes have thermal conductivities generally greater than 0.8 W/m·K at 23° C. and 50% relative humidity.

Reduction of the thermal conductivity of lightweight structural concretes is very desirable as it will offer a saving of heating energy in residence and professional buildings. Furthermore this reduction makes it possible to reduce the thermal bridges, particularly in the construction of buildings with several stories and having indoor thermal insulation, in particular the thermal bridges of the intermediary floors. However, a reduction of concrete thermal conductivity is usually obtained by a reduction of the density of the concretes. This decrease results in a loss of concrete strength, which makes the concrete unable to fulfill its structural function.

Various concrete formulations presenting reduced thermal conductivity have been proposed. However, such formulations do not make it possible to obtain sufficient compressive strength values. For example, U.S. Pat. No. 3,814,614 describes the use of particles of expanded glass to obtain a lightweight « structural » concrete. The concretes described in this patent however do not have sufficient compressive strength values. Likewise, GB Patent No. 1165005 describes the use of fly ash sprayed in lightweight structural concrete formulations. Similarly, even though the thermal conductivity is indeed reduced, the compressive strength of such concretes is also very much reduced and is not satisfactory. The use of clay aggregates or expanded shale aggregates for the production of lightweight non-structural concretes is also known, for example published patent applications BE 843768 and FR 2625131.

One of the aims of the present invention is to provide a lightweight concrete formulation capable of providing both sufficient compressive strength for a structural concrete and low thermal conductivity.

An embodiment of the present invention is a lightweight structural concrete comprising at least:
  a hydraulic binder;
  effective water;
  a superplasticizer; and
  aggregates;
the said concrete having a density in the fresh state varying from 1.40 to a $D_{max}$ value calculated according to formula (I)

$$D_{max} = 1.58 + (a \times AM) \quad \text{Formula (I)}$$

in which "a" represents a coefficient for which the value is equal to 1, advantageously equal to 0.9, preferably equal to 0.8;
  "AM" represents the mass percentage of the amorphous materials contained in 1 m³ of fresh concrete;
the said concrete having a maximum fresh state density $D_{max}$ less than or equal to 1.85, advantageously less than or equal to 1.8, preferably less than or equal to 1.7;

the said concrete having a $W_{effective}/L$ ratio varying from 0.19 to 0.46, where $W_{effective}$ represents the quantity of effective water in kilogram per cubic meter of fresh concrete;

"L" represents the quantity of cement and additions in kilograms per cubic meter of fresh concrete;

the said concrete comprising a quantity of effective water varying from 100 to 230 liters per cubic meter of fresh concrete;

the said concrete comprising a quantity of Portland clinker greater than or equal to 150 kilograms per cubic meter of fresh concrete;

the said concrete comprising a quantity of (Portland clinker+ optionally fly ash+optionally slags+optionally silica fume+optionally calcined shale+optionally calcined clays) greater than or equal to 300 kilograms per cubic meter of fresh concrete;

and the said concrete having a volume of paste greater than or equal to 300 $l/m^3$ of fresh concrete.

The quantity of admixture can be adjusted to obtain a target spread when the concrete is delivered.

The aggregates according to the present invention can have a size less than or equal to 31.5 mm.

The term « Amorphous materials » is to be understood according to the present invention as non-crystallized mineral substances, that is to say, not having an ordered atomic structure.

The term « Volume of paste » is to be understood according to the present invention as the volume of cement, additions, effective water, air, admixtures and aggregates of a size strictly less than 63 μm.

The lightweight structural concrete according to the present invention can be a concrete pre-cast on the worksite, a ready-mix concrete or a concrete made in a production plant of pre-cast elements. Preferably, the concrete according to the present invention is a ready-mix concrete. The term « Ready-mix concrete » is to be understood according to the present invention as a concrete having a sufficient workability open time to allow the transportation of the concrete to the worksite where it will be cast. Upon delivery, the concrete must be in a consistency class of at least S3 according to the EN 206-1 Standard. Preferably, the workability open time of ready mix concretes can be at least 2 hours.

In the case where the concrete is a ready-mix concrete it is necessary to:

adjust the dosage of superplasticizer in order to obtain an initial spread of the fresh concrete greater than or equal to 550 mm (measurement carried out according to the document: « Bétons autoplaçants—recommendations provisoires » published by the "Association Française de Génie Civil" in July 2002, appendix 1); and use dry or pre-saturated in water aggregates having a quantity of absorbable water less than or equal to 10% relative to the total mass of dry aggregates (in the case of pre-saturated in water aggregates, the given quantity of absorbable water will be the absorbable quantity of water before pre-saturation minus the quantity of water used for pre-saturation). In an equivalent manner, using other units, the quantity of absorbable water of the aggregates used in the ready-mix concrete formulations according to the present invention must be less than or equal to 80 liters per cubic meter of fresh concrete.

According to a variant, the concrete according to the present invention can comprise:

from 0.5 to 20% by volume of air.

The hydraulic binder according to the present invention comprises Portland cement and optionally additions. The Portland cement according to the present invention is as defined in the EN 197-1 European Standard. It mainly comprises Portland clinker. « Portland clinker » is to be understood according to the present invention as a hydraulic material comprising at least two thirds by mass of calcium silicates ($3CaO.SiO_2$ and $2CaO.SiO_2$), the remaining part comprising phases comprising aluminium and iron, as well as other components. The mass ratio $(CaO)/(SiO_2)$ should not be less than 2.0. The content of magnesium oxide (MgO) should not exceed 5.0% by mass.

The additions are generally pulverulent materials usable as partial substitution of the cement. The additions according to the present invention can be limestone, siliceous or silico-limestone powders, fly ash, slags, silica fume, calcined shale, calcined clays (including metakaolins), pozzolans or mixtures thereof. The additions are as defined in the EN 206 European Standard, paragraph 3.1.23.

The limestone, siliceous or silico-limestone powders according to the present invention are fine aggregates, characterised by a size of particles varying generally from 0.1 to 125 μm.

The term « fly ash » is to be understood according to the present invention as a material obtained by electrostatic or mechanical precipitation of pulverulent particles comprised in the fumes of burners fed by pulverulent carbon (see the EN 197-1 Standard, paragraph 5.2.4). The fly ash according to the present invention can be of a siliceous or calcic nature.

The term « slag » is to be understood according to the present invention as a slag selected from the granulated blast furnace slags according to the EN 197-1 Standard, paragraph 5.2.2.

The term « silica fume » is to be understood according to the present invention as a material obtained by reduction of high purity quartz by carbon in electric arch kilns used for the production of silicon and ferrosilicon alloys (see the EN 197-1 Standard, paragraph 5.2.7). The silica fume is formed of spherical particles comprising at least 85% by mass of amorphous silica.

The term « calcined shale » is to be understood according to the present invention as a material produced in a special kiln at an approximate temperature of 800° C. mainly comprising dicalcium silicate and monocalcium aluminate. (see the EN 197-1 Standard, paragraph 5.2.5).

The term « calcined clays » is to be understood according to the present invention as clays which have been submitted to a thermal treatment.

The term « clays » is to be understood according to the present invention as phyllosilicates, mainly having a layered structure, perhaps even fibrous phyllosilicates (for example aluminium and/or magnesium silicates), which, characterized by X-ray diffraction for example, have an atomic mesh parameter ($d_{(001)}$) of the [001] crystallographic planes varying from 7 to 15 Angströms. The clays according to the present invention can be selected from kaolinite ($d_{(001)}=7$ Angströms), smectites (generic term used to designate the swelling clays, including montmorillonite), illite, muscovite ($d_{(001)}=10$ Angströms), chlorites ($d_{(001)}=14$ Angströms), or mixtures thereof.

The term « pozzolans » is to be understood according to the present invention as siliceous and/or silico-aluminous materials mainly comprising reactive $SiO_2$ and $Al2O_3$. Among the pozzolans, natural pozzolans can be mentioned, which are generally materials of volcanic origin or sedimentary rocks, and calcined pozzolans, which are materials of volcanic origin, clays, shale or thermally-activated sedimentary rocks (see the EN 197-1 Standard, paragraph 5.2.3) The pozzolans according to the present invention can be selected from pumice, tuff, scoria or mixtures thereof.

According to a variant, the concrete according to the present invention comprises at least one treated aggregate. Preferably, all the aggregates are treated aggregates. The term « Treated aggregates » is to be understood according to the present invention as aggregates which have been mixed with a material or sprayed with a material which confers upon them a particular property. For example, the treatment can make the aggregates more water-repellent or can reduce their absorption capacity in water. A treated aggregate according to the present invention can be:

impregnated with a pure resin (based on alcane, asphalt, polyethylene vinyl acetate, silane, siloxane or epoxy); or impregnated by immersion or spraying of an emulsion of the resins mentioned above; or impregnated with a solution which gels over time, for example an inorganic gel (sodium silicate, aluminium hydroxide, iron hydroxide, magnesium hydroxide, or calcium carbonate gel), an organic gel (cellulose acetate, nitro-cellulose or alcohol+sodium oleate), or a natural organic gel (polysaccharide, including dextran or agar, caseine or gelled oils).

According to a variant, the concrete according to the present invention comprises polystyrene beads. The said polystyrene beads can be used to partially or totally replace the air and/or partially replace the aggregates.

According to a variant, the concrete according to the present invention comprises a hydraulic binder selected from a cement of the type:

CEM III, CEM IV or CEM V, or

CEM I or CEM II, mixed with additions.

Preferably, the additions can be a type of slag and/or fly ash and/or silica fume. According to a variant, the concrete according to the present invention comprises a cement of the CEM I or CEM II type, mixed with additions of a type of slag and/or fly ash and/or silica fume.

According to a variant, the concrete according to the present invention comprises aggregates selected from gravel, sands or mixtures thereof. Preferably, the concrete according to the present invention comprises a sand/gravel volume ratio varying from 3/7 to 7/3.

According to a variant, the concrete according to the present invention comprises a proportion of air varying from 1% to 16% by volume, preferably from 2% to 8% by volume. Preferably, the proportion of air is less than 5% by volume.

According to a variant, the concrete according to the present invention comprises a superplasticizer such as a polycarboxylate polyoxide.

Preferably, the concrete according to the present invention comprises lightweight aggregates. According to a variant of the concrete according to the present invention, the totality of the aggregates are lightweight aggregates.

According to another variant of the present invention, the lightweight structural concrete according to the present invention comprises non-lightweight aggregates. Preferably, the totality of the aggregates are non-lightweight aggregates.

According to another variant, the concrete according to the present invention comprises expanded glass aggregates. Preferably, all the aggregates are expanded glass aggregates. This solution is in particular advantageous to increase the quantity of amorphous material in the concrete according to the present invention.

Preferably, the concrete according to the present invention comprises a quantity of aggregates less than or equal to 700 liters per cubic meter of fresh concrete.

To obtain and control the proportion of desired air it is possible to add to the composition one or more air-entraining admixtures. These admixtures are typically used in the field of concretes and can be selected from the group of ionic or non-ionic surfactants, for example oleates, sulfonates and carboxylates.

The hydraulic binder according to the present invention comprises cement and optionally additions.

The cement according to the present invention is preferably as defined by the EN 197.1 European Standard. The cement according to the present invention can therefore be of the CEM I, CEM II, CEM III, CEM IV or CEM V type. Preferably the cement is of type:

CEM III, CEM IV or CEM V, or

CEM I or CEM II, mixed with additions

Preferably, the additions according to the present invention can be slags and/or fly ash and/or silica fume. Advantageously, the additions according to the present invention are slags.

The applicant discovered that the use of a CEM III, CEM IV or CEM V type of cement, or the CEM I or CEM II types with additions of the slag and/or fly ash and/or silica fume types makes it possible to obtain, surprisingly, a lightweight structural concrete comprising less than 5% by volume of air, whilst retaining thermal conductivity at less than 0.65 W/m·K at 23° C. and 50% relative humidity (RH). Preferably, the use of a CEM III, CEM IV or CEM V type of cement, or of the CEM I or CEM II types, with additions of the slag and/or fly ash and/or silica fume types makes it possible to not add air during the preparation of the lightweight structural concrete according to the present invention, while retaining thermal conductivity less than 0.65 W/m·K at 23° C. and 50% relative humidity (RH).

The term « Thermal conductivity » is to be understood according to the present invention as thermal conductivity at 23° C. and 50% RH, determined according to the following procedure:

measurement of the dry thermal conductivity according to the guarded hot plate method (ISO 8302 Standard), after complete drying of the sample, then conversion of the obtained value to correspond to 50% relative humidity conditions by applying a coefficient of 1.083, in conformity with the NF EN ISO 10456 Standard, paragraph 7.3.

Admixtures can be added to modify the setting speed or to modify or control certain physico-chemical properties of the composition, for example plasticizers or water-repelling agents.

According to a preferred embodiment of the present invention, a superplasticizer admixture is selected from the polyoxide polycarboxylates family (PCP). Other superplasticizer admixtures which can be used to implement the present invention are the polynaphtalene sulfonates, lignosulfonates, phosphonates, carboxylates and melamine resins.

According to a preferred embodiment, the lightweight structural concrete has thermal conductivity at 23° C. and 50% RH less than 0.65 W/m·K, preferably less than 0.60 W/m·K, and even more preferably less than 0.55 W/m·K.

Advantageously the concrete according to the present invention has thermal conductivity at 23° C. and 50% RH less than 0.60 W/m·K for concretes belonging to the LC 25/28 strength class (that is to say having a typical 28-day compressive strength on a cylinder of at least 25 MPa, determined in accordance with the EN 206 Standard). According to a preferred embodiment the typical compressive strength is at least 28 MPa, more preferably at least 35 MPa and even more preferably at least 45 MPa.

The invention also relates to a process for the preparation of a lightweight structural concrete as described above, this process comprising a mixture of at least:
- a hydraulic binder;
- effective water;
- a superplasticizer; and
- aggregates;

the said concrete having a $W_{effective}/L$ ratio varying from 0.19 to 0.46,
  where $W_{effective}$ represents the quantity of effective water in kilogram per cubic meter of fresh concrete;
    "L" represents the quantity of cement and additions in kilograms per cubic meter of fresh concrete;

the said concrete comprising a quantity of effective water varying from 100 to 230 liters per cubic meter of fresh concrete;

the said concrete comprising a quantity of Portland clinker greater than or equal to 150 kilograms per cubic meter of fresh concrete;

the said concrete comprising a quantity of (Portland clinker+ optionally fly ash+optionally slags+optionally silica fume+optionally calcined shale+optionally calcined clays) greater than or equal to 300 kilograms per cubic meter of fresh concrete;

and the said concrete having a volume of paste greater than or equal to 300 l/m³ of fresh concrete.

According to another variant, the present invention also relates to a process for the preparation of a lightweight structural concrete as described above, this process comprising the mixture of at least:
- a hydraulic binder;
- effective water;
- a superplasticizer; and
- aggregates;

the said concrete having a density in the fresh state varying from 1.40 to a $D_{max}$ value calculated according to formula (I)

$$D_{max}=1.58+(a \times AM) \quad \text{Formula (I)}$$

in which "a" represents a coefficient for which the value is equal to 1, advantageously equal to 0.9, preferably equal to 0.8;
  "AM" represents the mass percentage of the amorphous materials contained in 1 m³ of fresh concrete;

the said concrete having a maximum fresh state density $D_{max}$ less than or equal to 1.85, advantageously less than or equal to 1.8, preferably less than or equal to 1.7;

the said concrete having a $W_{effective}/L$ ratio varying from 0.19 to 0.46,
  where $W_{effective}$ represents the quantity of effective water in kilogram per cubic meter of fresh concrete;
    "L" represents the quantity of cement and additions in kilograms per cubic meter of fresh concrete;

the said concrete comprising a quantity of effective water varying from 100 to 230 liters per cubic meter of fresh concrete;

the said concrete comprising a quantity of Portland clinker greater than or equal to 150 kilograms per cubic meter of fresh concrete;

the said concrete comprising a quantity of (Portland clinker+ optionally fly ash+optionally slags+optionally silica fume+optionally calcined shale+optionally calcined clays) greater than or equal to 300 kilograms per cubic meter of fresh concrete;

and the said concrete having a volume of paste greater than or equal to 300 l/m³ of fresh concrete.

Another embodiment of the present invention is the use of a lightweight structural concrete as described above as construction material.

A third embodiment of the present invention is a hardened concrete object obtained from a lightweight structural concrete as described above.

EXAMPLES OF PREFERRED EMBODIMENTS

Determination of the Quantity of Amorphous Materials in the Concrete

Primarily, the quantity of amorphous material of each of the solid constituents of the concrete is determined in the manner described below.

A mix is made with the constituent to be analyzed and a completely crystallized reference component for which the composition is known (for example rutile, alumina or zircon). The mix generally comprises 50% by mass of the constituent to be analyzed and 50% by mass of the reference component. The mix must be perfectly homogenised and the relative proportions of the constituent to be analyzed and the reference component must be precisely known.

The reference component is selected according to the constituent to be analyzed. Preferably, according to a first case, the reference component is different from the crystals which can be found in the constituent to be analyzed. In all cases, in order to not falsify the quantitative measurement, a reference component is chosen, similar in terms of intensity of the response to the crystals present in the constituent to be analyzed, as known in the field of X-ray diffraction.

A quantitative measurement of the mix is carried out, for example using the quantitative X-ray diffraction method (see on this subject the publication: *Quantitative X-Ray Diffraction Analysis*, L. E. COPELAND and Robert H. BRAGG, Analytical Chemistry).

The nature and the quantity of the crystals present in the mix are obtained. The amorphous material does not diffract the X-rays and therefore does not appear in the results of the quantitative measurement. The quantity of amorphous material of the constituent to be analyzed ($AM_I$) by mass percentage relative to the mass of the constituent to be analyzed can be determined according to the following formula (II):

$$AM_I=100\times[100\div(100-X_0)]\times[1-(X_0\div X_m)] \quad \text{Formula (II)}$$

in which $X_0$ represents the mass percentage of the reference component in the mix (constituent to be analyzed+reference component);

$X_m$ represents the mass percentage of the reference component determined by the quantitative measurement.

According to a second case, the reference material is a crystalline phase also present in the constituent to be analyzed, the quantitative measurement is first carried out separately on the constituent to be analyzed and on the reference material, in order to determine the quantity of the same crystalline phase in the constituent to be analyzed. In this manner, knowing the quantity of the crystalline phase in the constituent to be analyzed and the relative proportion of the constituent to be analyzed and the reference material, it is possible to determine $X_m$. It is then possible to apply formula (II).

Finally, to obtain the quantity of amorphous material in the fresh concrete (by mass percentage), the quantity of the amorphous material of each of the concrete's constituents is multiplied by the quantity of this constituent in 1 cubic meter of concrete, then the different obtained values are added together.

The lightweight structural concrete according to the present invention is exemplified by the preferred embodiments described below.

Examples 1 and 2

Aggregates of Expanded Shale

Example 1

| Components | Mass and volumes relative to a m³ of fresh material | % by weight |
|---|---|---|
| Artificial Portland cement | 373 kg | 24.5% by weight |
| Total water | 188 l | 12.5% |
| ... (including effective water) | 103 l | 7.5%) |
| Air | 143 l i.e. 14.3% by volume | |
| Expanded shale sand | 539 kg | 35.5% |
| Expanded shale gravel | 408 kg | 27% |
| Superplasticizer | 6 l | 0.4% |
| Air-entraining agent | 3 l | 0.2% |
| Amorphous materials | 0 | 0 |

The cement used is the artificial Portland cement, of 3.15 by volume density. This cement is in the CEM I 52.5 class (EN197-1 Standard) coming from the Le Havre plant.

The expanded shale sand has a real volume density in the dry state of 1.92 and water absorption of 4.5% by weight.

The expanded shale gravel supplied by the GEM company (Mayenne, France) has a granulometry of 4 to 10 mm, a real volume density of 1.29 and water absorption of 7.2% by weight.

The superplasticizer admixture is in the polycarboxylate polyoxide (PCP) family, it is GLENIUM 27 from BASF and the selected air-entraining agent is a sulfonate: Microair 104 from BASF. The limestone filler has a density of 2.6 and a granulometric distribution of from 0 to 100 μm (median diameter 8 μm), and is available under the brand BETOCARB HP-EN (formerly called BETOCARB P2 from Entrains) by the OMYA company.

Determination of the air content of each concrete is carried out in accordance with the ASTM C173 Standard.

The production process is that of a standard lightweight concrete and can be modified and/or adjusted if desired. The process used in these examples is the same as for examples 1 to 3.

The ingredients in these examples are introduced in a standard mixer of the ZYKLOS brand.

A preliminary step of pre-wetting the aggregates is carried out during which the aggregates are mixed for two minutes with the pre-wetting water then left to rest for a certain period of time (for example 24 hours). Then the following steps are carried out:

mixing the aggregates for 1 minute the mixing is stopped for 4 minutes introduction in 30 seconds of the binders (cement and filler) in the mixer mixing is resumed for 1 minute introduction in 30 seconds of the mixing water in the mixer, while continuing the mixing mixing for 1 minute.

The cylinders and cubes are made in three layers, and the material is placed using a rodding bar. After filling the moulds, the specimens are kept at 20±1° C. and at 95% RH. At 24 hours the specimens are removed from the moulds, they are placed in water where the specimens have a density greater than 1, and placed on a shelf for the others. The compressive cylinders are corrected before testing.

The compressive strength measurements are carried out on cylinders, 11 cm in diameter and 22 cm high. An estimation of the strength on a 15-cm side cube is also given.

To obtain the density of the concrete in the fresh state, the volume density of the fresh concrete is determined according to the EN 12350-6 Standard, then it is divided by the volume density of the water, that is 1000 kilograms per cubic meter.

The content of a concrete's effective water is the difference between the quantity of total water contained in 1 cubic meter of fresh concrete and the quantity of water absorbable by the aggregates. The quantity of water absorbable by the aggregates is determined by multiplying the water-absorption coefficient of the aggregates by the mass of dry aggregates in 1 cubic meter of concrete. The water-absorption coefficient of the aggregates is obtained according to the method described in Appendix C of the EN 1097-6 Standard at 24 hours. This method is valid for the sizes of aggregates varying from 4 to 31.5 mm. For the sizes of aggregates less than 4 mm, the method described in the EN 1067-6 Standard, chapter 9 should be used.

The other properties of the concrete thus obtained are determined using the EN 12390-3, EN 206-1, ISO 3806 and NF EN ISO 10456 Standards. Those typical properties are the following:

| | |
|---|---|
| $W_{effective}/L$ ratio: | 0.28 |
| Density in the fresh state: | 1.48 |
| Density in the dry state: | 1.39 |
| Compressive strength at 28 days on a cylinder: | 35 MPa |
| Estimation of the strength on a 15-cm side cube: | 40 MPa |
| Thermal conductivity at 23° C. and 50% RH: | 0.58 W/m · K |

Example 2

| Components | Mass and volumes relative to a m³ of fresh material | % by weight |
|---|---|---|
| Mass of Portland cement | 393 kg | 25% |
| Mass of limestone filler | 126 kg | 8% |
| Total water | 209 l | 13% |
| (... including the effective Water) | 152 l | 9.5% |
| Air | 80 l i.e. 8% by volume | |
| Expanded shale sand | 546 kg | 34.5% |
| Expanded shale gravel | 298 kg | 19% |
| Superplasticizer | 5 l | 0.3% |
| Air-entraining agent | 1 l | 0.05% |
| Amorphous materials | 0 | 0 |

The cement, the superplasticizer, the air-entraining agent and the limestone filler are the same as those described in example 1.

The expanded shale sand has a real volume density in the dry state of 1.92, and water absorption of 4.5% by mass.

The expanded shale gravel has a granulometric distribution of 4 to 10 mm, a real volume density of 1.29 and water absorption of 7.2% by mass. The sand and the gravel come from the GEM company (Mayenne, France).

Properties of the Concrete Thus Obtained:

| | |
|---|---|
| $W_{effective}/L$ ratio: | 0.29 |
| Density in the fresh state: | 1.58 |
| Density in the dry state: | 1.41 |
| Compressive mechanical strength at 28 days on a cylinder: | 40 MPa |
| Estimation of the strength on a 15-cm side cube: | 45 MPa |
| Thermal conductivity at 23° C. and 50% RH: | 0.61 W/m · K |

Example 3

Second Class of Aggregates: Expanded Clay

| Components | Mass and volumes relative to a m³ of fresh material | % by weight |
|---|---|---|
| Mass of Portland cement | 433 kg | 27.5% |
| Mass of limestone filler | 150 kg | 9.5% |
| Total water | 275 l | 17.5% |
| (. . . including the effective Water) | 119 l | 7.5% |
| Air | 90 l i.e. 9% by volume | |
| Expanded clay sand | 307 kg | 19.5% |
| Expanded clay gravel | 394 kg | 25% |
| Superplasticizer | 4 l | 0.25% |
| Air-entraining agent | 0.8 l | 0.05% |
| Amorphous materials | 0 | 0 |

The Portland cement, the filler, the superplasticizer and the air-entraining agent are the same as those used in example 1.

The expanded clay sand has a real volume density in the dry state of 1.15, and water absorption of 28% by mass.

The expanded clay gravel has a granulometric distribution of 4 to 8 mm, a real volume density of 1.28 and water absorption of 18% by mass. The sand and the gravel come from the Argex company (Belgium).

Properties of the Concrete Thus Obtained:

| | |
|---|---|
| $W_{effective}/L$ ratio: | 0.20 |
| Density in the fresh state: | 1.41 |
| Density in the dry state: | 1.26 |
| Compressive mechanical strength at 28 days on a cylinder: | 29 MPa |
| Estimation of the strength on a 15-cm side cube: | 33 MPa |
| Thermal conductivity at 23° C. and 50% RH: | 0.52 W/m · K |

The formulations of lightweight structural concretes according to the present invention provide both a high compressive strength and reduced thermal conductivity compared to those of concretes usually available in the field. Additionally these formulations are simple and easy to implement. Finally, the materials used have a relatively low cost and are easily available. This makes these formulations particularly useful in the industry.

Example 4

Second Class of Aggregates: Expanded Clay—Impact of the Nature of the Additions Used The volume substitution of the limestone filler previously described by fly ash or blast furnace slag makes it possible to considerably reduce thermal conductivity without penalising the mechanical strengths.

The example with the slag shows that with this type of addition it is possible to formulate a concrete without entrained air.

| | Mass and volumes relative to a m³ of fresh material Components | | |
|---|---|---|---|
| Type of addition | Limestone filler | Fly ash | Slag |
| Mass of Portland cement | 408 kg | 408 kg | 408 kg |
| Masse of limestone filler | 172 kg | | |
| Mass of fly ash | | 152 kg | |
| Mass of slag | | | 195 kg |
| Total water | 266 l | 266 l | 266 l |
| (. . . including the effective Water) | 133 l | 133 l | 133 l |
| Air | 25 l i.e. 2.5% by volume | 25 l i.e. 2.5% by volume | 25 l i.e. 2.5% by volume |
| Expanded clay sand | 306 kg | 306 kg | 306 kg |
| Expanded clay gravel | 344 kg | 344 kg | 344 kg |
| Superplasticizer | 4.06 kg | 3.92 kg | 4.22 kg |
| Plasticizer | 1.33 kg | 1.29 kg | 1.39 kg |
| Amorphous materials | 0 | 103 kg | 185 kg |

The Portland cement, the limestone filler, the superplasticizer are the same as those presented in example 1. The sand and gravel of expanded clay are identical to those presented in example 3. The plasticizer admixture is of the lignosulfonates family, it is POZZOLITH 391N from BASF.

The fly ash used is an ash of the V type (EN 197-1 Standard) distributed by the Surchistes company and coming from the Carling thermal power plant. The density of this ash is 2.36, the Blaine specific surface is 3520 cm²/g.

The slag used in this example is slag produced by Mittal-Arcelor at Fos Sur Mer. The density of this slag is 2.95, the Blaine specific surface is 3258 cm²/g.

The mass percentage of the amorphous materials is respectively 67.8% in the fly ash and 94.9% in the slag.

Properties of the Concretes Thus Obtained:

| Type of addition | Limestone Filler | Fly ash | Slag |
|---|---|---|---|
| $W_{effective}$/L ratio: | 0.23 | 0.24 | 0.22 |
| Density in the fresh state: | 1.65 | 1.63 | 1.67 |
| Density in the dry state: | 1.47 | 1.46 | 1.48 |
| Compressive mechanical strength at 28 days on a cylinder: | 41.8 | 44 | 40.8 |
| Estimation of the strength on a 15-cm side cube: | 46.8 | 49.2 | 45.7 |
| Thermal conductivity at 23° C. and 50% RH: | 0.697 | 0.635 | 0.598 |

The use of slag or fly ash instead of the limestone filler makes it possible to reduce thermal conductivity for equivalent mechanical strengths.

Furthermore, for a quantity of air as low as 2.5% by volume, the formulations comprising slag or fly ash make it possible to obtain a thermal conductivity coefficient less than 0.65, while the formulation comprising the limestone filler does not allow this. The use of slag or fly ash instead of the limestone filler therefore makes it possible to reduce the quantity of air while maintaining a low thermal conductivity coefficient.

The association of the Portland cement with the additions with a base of slag or of ash can be replaced by slag-blended or fly ash-blended cements of the CEM II/A, CEM II/B, CEM III/A, CEM III/B, CEM III/C, CEM V/A or CEM V/B type.

It is well understood that any characteristic described above relating to any embodiment can be used alone, or in combination with other described characteristics, and can also be used in combination with one or more characteristics from any other embodiments, or any combination of any other embodiments.

The invention claimed is:

1. A lightweight structural concrete comprising:
 a hydraulic binder;
 water;
 a superplasticizer; and
 aggregates;
 said concrete having a density varying from 1.40 to a $D_{max}$ value calculated according to formula (I)

$$D_{max}=1.58+(a \times AM) \quad \text{Formula (I)}$$

in which a represents a coefficient for which the value is equal to 1;
 AM represents the mass percentage of the amorphous materials contained in 1 m³ of concrete;
 said concrete having a maximum density $D_{max}$ less than or equal to 1.85;
 said concrete having a W/L ratio varying from 0.19 to 0.46, where W represents the quantity of water in kg/m³ of concrete;
 L represents the quantity of cement and additions in kg/m³ of concrete, the additions selected from the group consisting of inert material and pozzolanic or latent hydraulic material and any mixture thereof;
 said concrete comprising a quantity of water varying from 100 to 230 l/m³ of concrete;
 said concrete comprising a quantity of Portland clinker greater than or equal to 150 kg/m³ of concrete;
 said concrete comprising a quantity of Portland clinker+optionally fly ash+optionally slag+optionally silica fume+optionally calcined shale+optionally calcined clays greater than or equal to 300 kg/m³ of concrete;
 said concrete having a volume of paste greater than or equal to 300 l/m³ of concrete;
 said concrete comprising from 1 to 16% by volume of air.

2. The concrete according to claim 1, comprising at least one treated aggregate which is coated by spraying or immersion.

3. The concrete according to claim 1, comprising a hydraulic binder selected from the group consisting of Portland cement III, Portland cement IV, and Portland cement V or from a group consisting of Portland cement I and Portland cement II, mixed with additions selected from the group consisting of inert material and pozzolanic or latent hydraulic material and any mixture thereof.

4. The concrete according to claim 1, comprising Portland cement I or Portland cement II, mixed with additions of slag, or fly ash, or silica fume or any combination thereof.

5. The concrete according to claim 1, wherein the proportion of air in the mix varies from 2% to 8% by volume of concrete.

6. The concrete according to claim 1, wherein the proportion of air is less than 5% by volume of concrete.

7. The concrete according to claim 1, wherein the superplasticizer is polycarboxylate polyoxide.

8. A process for the preparation of a lightweight structural concrete according to claim 1, the process comprising a mixture of at least:
 a hydraulic binder;
 water;
 a superplasticizer; and
 aggregates;
 said concrete having a W/L ratio varying from 0.19 to 0.46, where W represents the quantity of water in kg/m³ of concrete;
 L represents the quantity of cement and additions in kg/m³ of concrete, the additions selected from the group consisting of inert material and pozzolanic or latent hydraulic material and any mixture thereof;
 said concrete comprising a quantity of water varying from 100 to 230 l/m³ of concrete;
 said concrete comprising a quantity of Portland clinker greater than or equal to 150 kg/m³ of concrete;
 said concrete comprising a quantity of Portland clinker+optionally fly ash +optionally slags+optionally silica fume+optionally calcined shale+optionally calcined clays greater than or equal to 300 kg/m³ of concrete;
 said concrete having a volume of paste greater than or equal to 300 l/m³ of concrete;
 said concrete comprising from 1 to 16% by volume of air.

9. A method comprising using a lightweight structural concrete according to claim 1 as a construction material.

10. A hardened concrete object obtained from a lightweight structural concrete according to claim 1.

11. The concrete according to claim 1, wherein a is equal to 0.9.

12. The concrete according to claim 1, wherein a is equal to 0.8.

13. The concrete according to claim 1, wherein the maximum density $D_{max}$ is less than or equal to 1.8.

14. The concrete according to claim 13, wherein the maximum density $D_{max}$ is less than or equal to 1.7.

15. The concrete according to claim 1, wherein the quantity of water corresponds to the quantity of water involved in hydration of the hydraulic binder.

16. The concrete according to claim 1, wherein the additions are selected from the group consisting of limestone, siliceous or silico-limestone powder, fly ash, slag, silica fume, calcined clay, calcined shale, mineral filler aggregate, and any mixture thereof.

17. The concrete according to claim 1, wherein the additions are as defined in EN 206 European Standard.

18. The process according to claim 8, wherein the additions are selected from the group consisting of limestone, siliceous or silico-limestone powder, fly ash, slag, silica fume, calcined clay, calcined shale, mineral filler aggregate, and any mixture thereof.

19. The process according to claim 8, wherein the additions are as defined in EN 206 European Standard.

* * * * *